(12) United States Patent
Trenne et al.

(10) Patent No.: US 7,092,814 B1
(45) Date of Patent: Aug. 15, 2006

(54) SEQUENTIAL ENGINE FUNCTION CONTROL SYSTEM

(75) Inventors: Myron U. Trenne, Farmington Hills, MI (US); Dwayne S. Bontrager, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/943,119

(22) Filed: Sep. 16, 2004

(51) Int. Cl.
*F02D 41/30* (2006.01)
*F02D 45/00* (2006.01)
*F02P 7/03* (2006.01)

(52) U.S. Cl. .................. 701/105; 701/115; 123/490; 123/643; 123/90.11

(58) Field of Classification Search .................. None
See application file for complete search history.

(56) References Cited

U.S. PATENT DOCUMENTS 5,199,394 A * 4/1993 Hartmann et al. ....... 123/179.1
6,120,005 A    9/2000  Wright
6,240,903 B1   6/2001  Kurozumi
6,502,547 B1   1/2003  Kennedy et al.
6,666,190 B1  12/2003  DiMaria et al.

* cited by examiner

*Primary Examiner*—Andrew M. Dolinar
(74) *Attorney, Agent, or Firm*—Young & Basile, P.C.

(57) ABSTRACT

A system for actuating sequential engine function transducers such as fuel injector solenoids comprising a plurality of switch nodes equal in number to the number of cylinders of the engine. Each switch node includes a high current switch such as a transistor and an individually addressable driver circuit for causing the transistor to conduct when an address unique to the driver is received. The nodes are preferably disposed in close physical proximity to the injector solenoids. Low current address carrying lines are connected between the address generator and the individual switch drivers to activate them in sequence. Only a single high voltage high current supply line need be provided. The transducers may also be intake and/or exhaust valve actuators or spark ignition devices.

10 Claims, 5 Drawing Sheets

SEQUENTIAL ENGINE FUNCTION CONTROL SYSTEM

FIELD OF THE INVENTION

This invention relates to systems for controlling the actuation of electrically driven engine function transducers such as fuel injector solenoids and intake and exhaust valve actuators, and more particularly to a control system which substantially reduces the number and size of conductors running between an engine control unit (ECU) and the engine function transducers.

BACKGROUND OF THE INVENTION

Internal combustion engines of the reciprocating piston type are inherently sequential devices in that they typically comprise a plurality of cylinders and associated combustion chambers each of which has associated with it a number of electrically driven engine function transducers such as fuel injectors. Gasoline engines may have other sequential engine function transducers such as spark igniters and, for more technologically sophisticated engines, electrically driven intake and exhaust valve actuators which replace conventional cam shafts. The control system for such devices typically comprises an ECU having within it a plurality of high current power switches equal in number to the number of cylinders in the engine. High current capacity conductors run between the switches in the ECU and the transducers which are typically mounted on the engine itself. Because the ECU with its associated power switches is mounted some distance from the engine and further because the transducers are disposed at different locations around the engine at different distances from the ECU, the wires which connect the ECU switches to the transducers are of differing lengths.

The presence of these multiple high current conductors in itself presents a number of disadvantages including the cost and weight of the conductive material and the increase in the complexity of electrical systems found under the hood of modern automobiles. In addition, each high current conductor constitutes a source of electromagnetic interference (EMI) which, if inadvertent functions or malfunctions of other onboard devices are to be avoided, requires shielding and/or careful routing of the conductors as well as thoughtful locations of other EMI sensitive components.

In addition, the differing lengths of the conductors pose other problems including variations in current conductance caused by the delivery of electrical impulses along conductive lines of differing lengths. This is particularly problematical in the case of diesel engines where the fuel injecting transducers (injection solenoids) must be precisely controlled as to timing so that the fuel load is introduced into the combustion chamber in the correct relationship to piston position under different operating conditions. Timing the actuation of intake and exhaust valves in camless engines poses similar issues of timing precision.

SUMMARY OF THE INVENTION

The present invention is a control system for plural sequential engine function transducers in multi-cylinder internal combustion engines which control system dramatically reduces and/or eliminates the cost, weight, EMI and timing problems described above. The control system is a physical layer comprising the components that connect the ECU to the transducers. In general, the objective is accomplished by providing each cylinder with a uniquely addressable switch node including a high current switch which can be located in close physical proximity to the engine function transducer to be controlled and which can be connected for actuation to an ECU by lightweight low current conductors in a simple and conventional wiring harness made up primarily of low voltage intelligence carrying wires from a sequential address generator associated with the ECU. The ECU has no high current switches for transducer excitation. A single power line can be run from an electrical source such as an automobile battery to the high current switch in each of the nodes. A smaller number of circuits reduces the weight, complexity and cost of the high current power conductor system. The potential of EMI reduction is realized by shortening the length of the grounding path from the engine function transducer to ground. The ECU is no longer needed as a grounding point.

In accordance with the invention, a sequence of addresses is generated and communicated to the switch nodes to uniquely and sequentially activate the individual switches in the nodes in a sequence which corresponds, for example, to the firing order of the cylinders. This arrangement works equally well for any of the sequential engine function transducers including fuel injector solenoids, spark plugs and/or intake and exhaust valves.

In a preferred embodiment hereinafter described, the switches are transistors such as field effect transistors, bi-polar junction transistors or equivalent relatively high current switches.

Other applications of the present invention will become apparent to those skilled in the art when the following description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein.

DETAILED DESCRIPTION OF THE ILLUSTRATIVE EMBODIMENT

Figure 1:
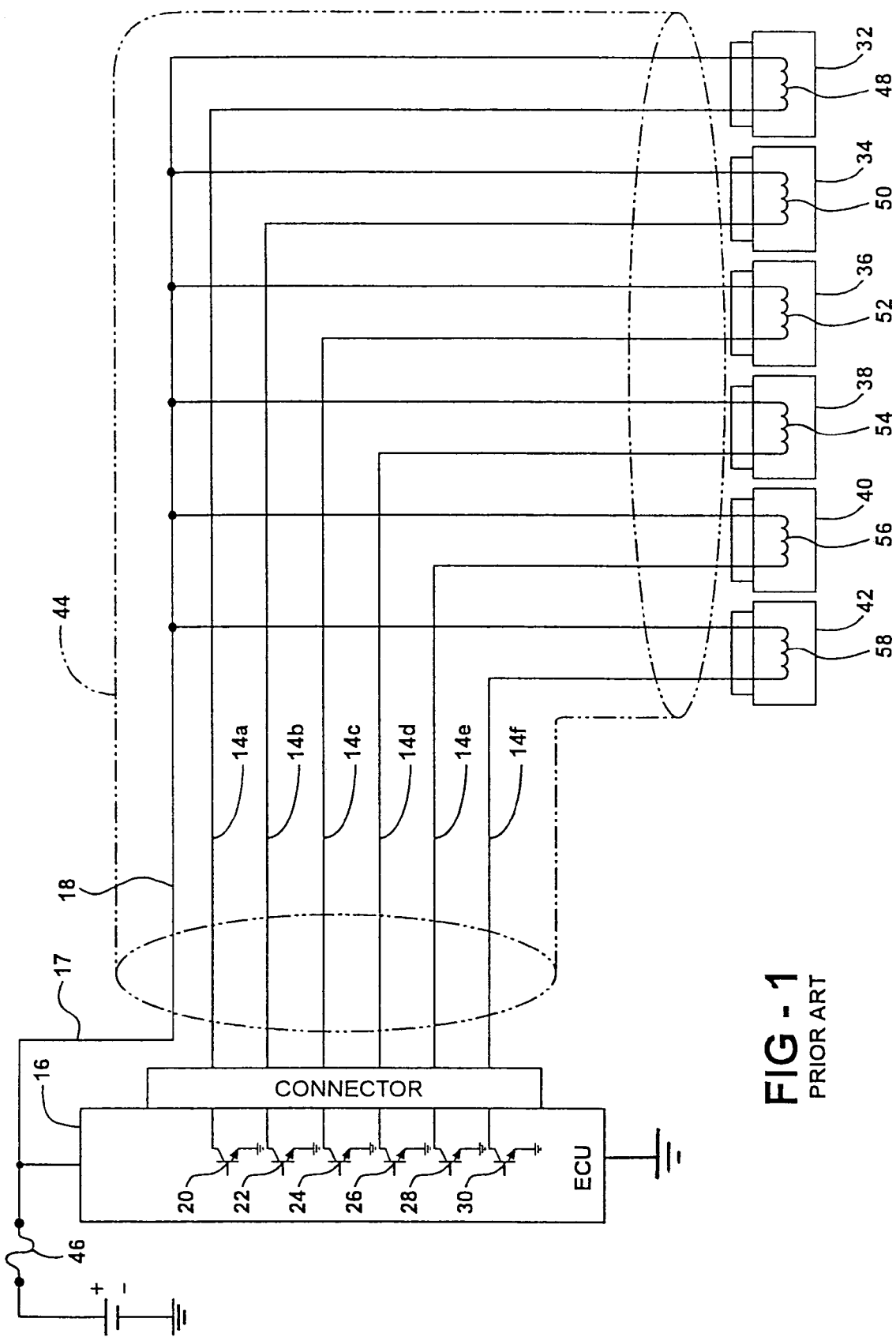
FIG. 1 represents a prior art timing and control system for the fuel injectors in a 6-cylinder internal combustion engine.
Figure 2:
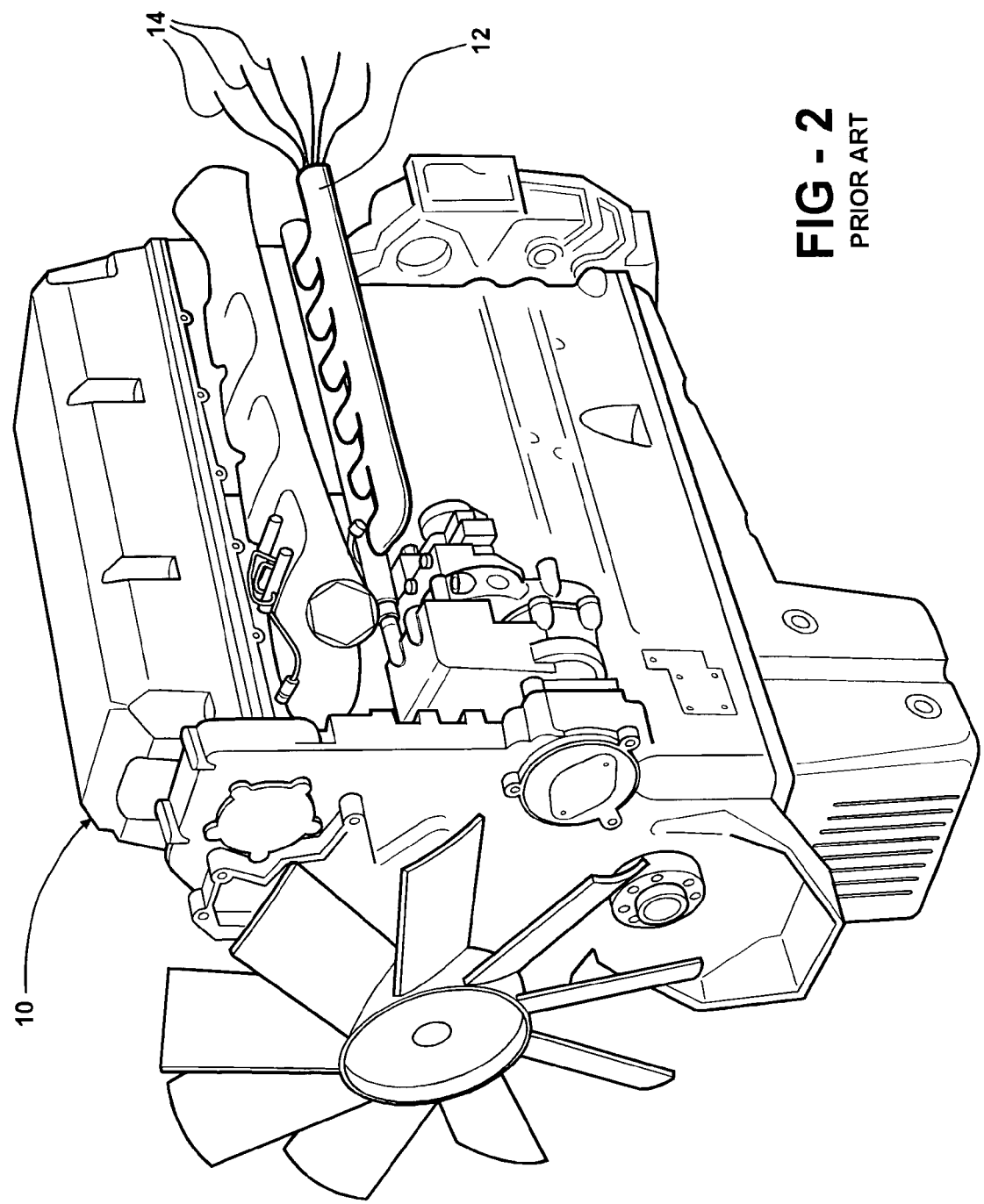
FIG. 2 illustrates a conventional internal combustion engine using the system of FIG. 1.

Referring to FIGS. 1 and 2, the prior art system is shown in connection with a 6-cylinder diesel engine 10 having a fuel rail 12 including a plurality of high current injector actuator conductors 14 extending from an engine control unit (ECU) 16 to a plurality of fuel injector units 32, 34, 36, 38, 40 and 42 associated with the respective cylinders of the engine 10. The ECU 16 comprises a connection 17 to a high voltage source such as the vehicle battery and a bank of high current capability transistors 20, 22, 24, 26, 28 and 30. The high voltage connection 17 extends into a supply line 18 and has a fuse 46 typically rated, for example, at 20 or more amps. The individual transistors 20, 22, 24, 26, 28 and 30 are connected to individual high current conductors 14*a*, 14*b*, 14*c*, 14*d*, 14*e* and 14*f* which along with the high voltage supply line 18 make up a wiring harness 44 which extends from the ECU 16 to the engine 10. The engine includes the fuel injector units 32, 34, 36, 38, 40 and 42. The injector units further comprise injector solenoids 48, 50, 52, 54, 56 and 58 which can be supplied with relatively high current pulses by switching the individual transistors 20, 22, 24, 26, 28 and 30. It can, for example, be seen that by causing the transistor 20 to become conductive a circuit is completed from the battery connection 17 through line 18, through the injector solenoid 48, back along conductor 14*a* and through the transistor 20 to ground. Ideally, the transistors 20, 22, 24, 26, 28 and 30 are rendered conductive individually according to the firing order of the engine cylinders. Although each solenoid 48, 50, 52, 54, 56 and 58 requires approximately 2.5 amps for full activation, inductive effects are such that in-rush current effects are unavoidable and for this reason the fuse 46 must be selected at a substantially higher rating. The presence of seven relatively long conductors 14*a*, 14*b*, 14*c*, 14*d*, 14*e*, 14*f* and 18 running from the ECU 16 to the engine 10 adds weight and complexity to the engine compartment along with the inherent disadvantages described above.

Figure 3:
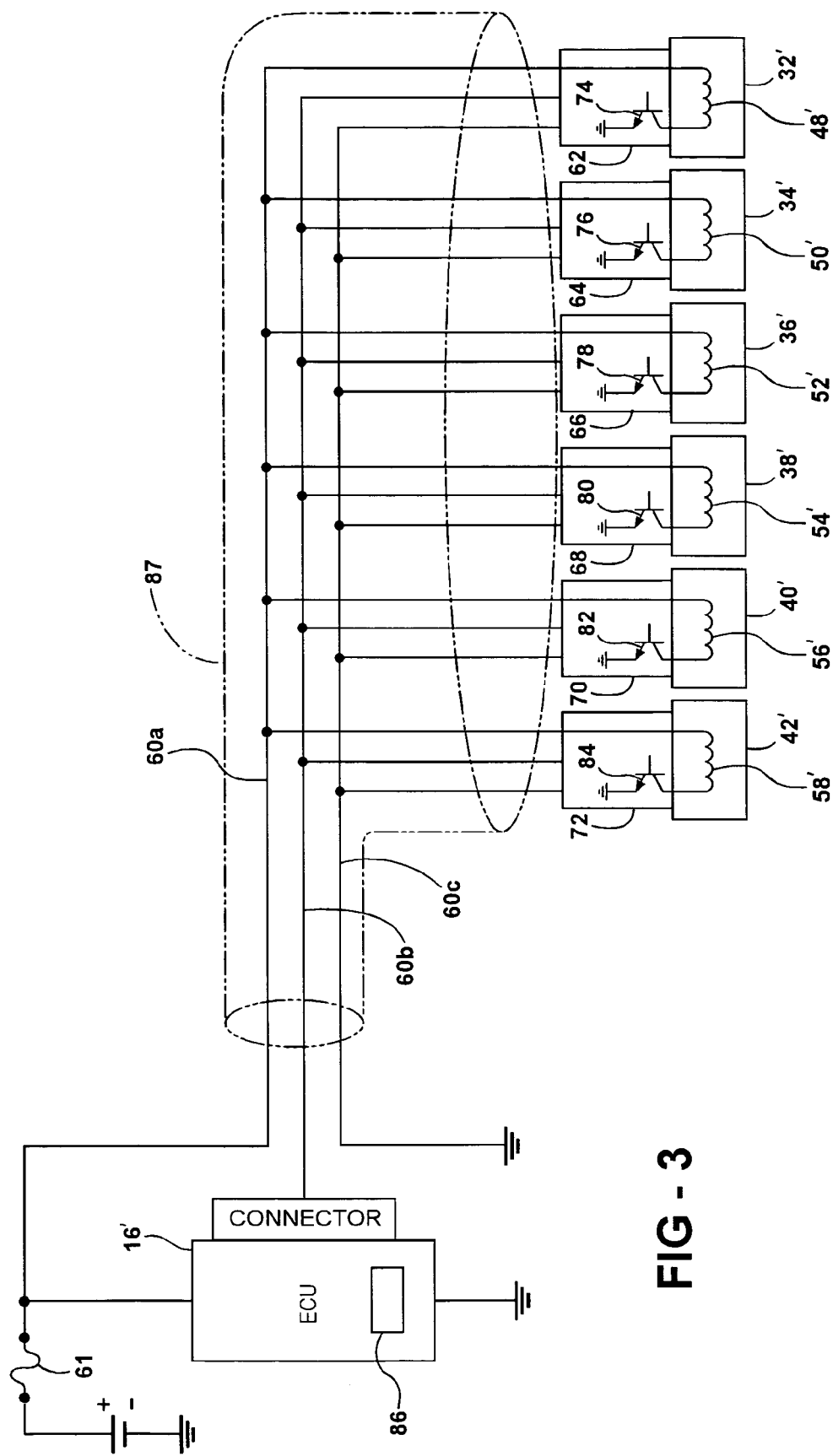
FIG. 3 is a circuit diagram for a sequential engine function transducer timing and control system according to the present invention.
Figure 4:
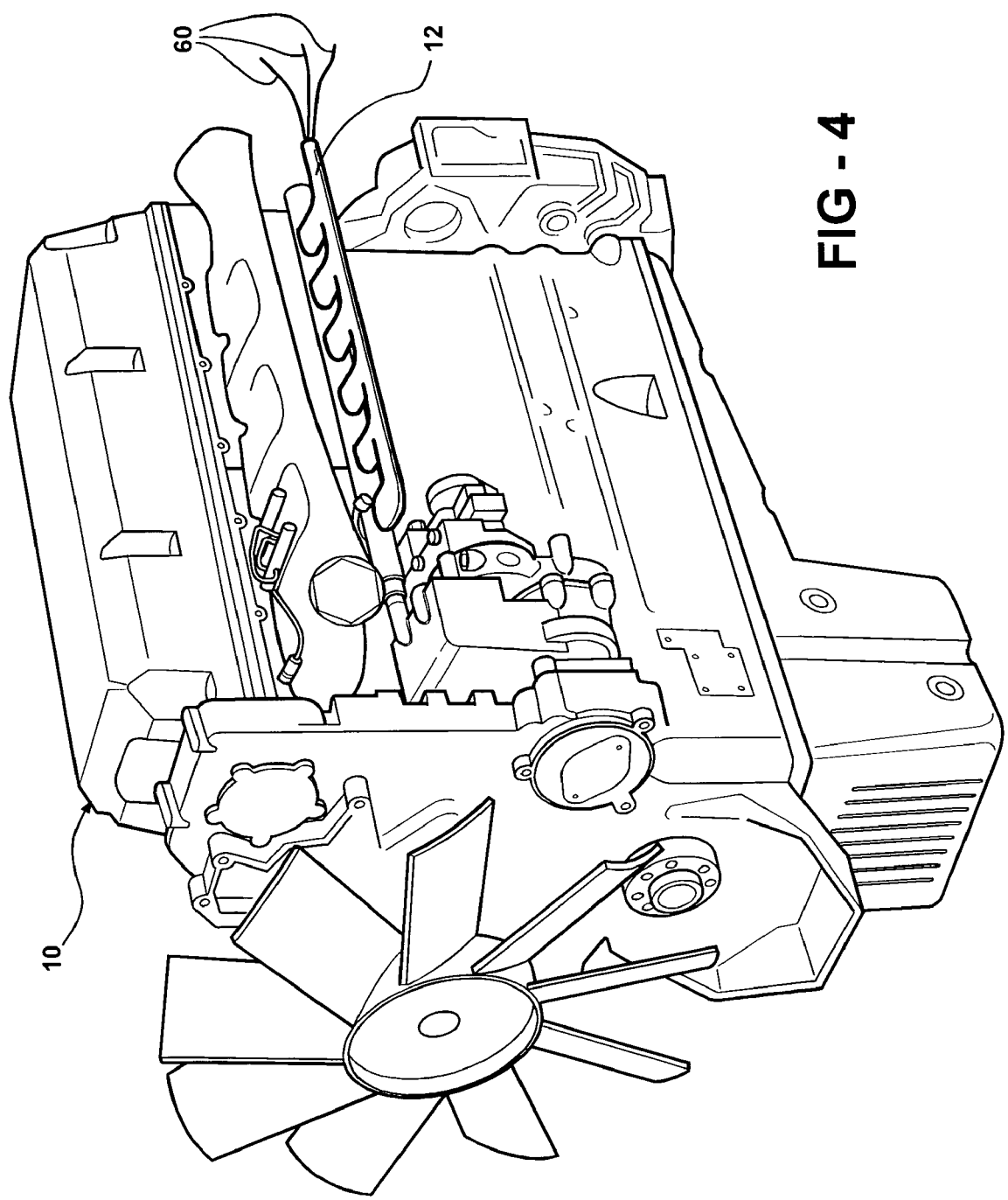
FIG. 4 is an illustration of an internal combustion engine equipped with the system of FIG. 3.

Referring now to FIGS. 3 and 4, the improvements and advantages derived from the present invention will be described. The 6-cylinder diesel engine 10 has a fuel rail 12, but in this instance only three conductors 60 are connected from the ECU 16' to the engine as shown. In FIG. 3, the ECU 16' has a power conductor 60*a* connected through a fuse 61 to a plurality of identical switch nodes 62, 64, 66, 68, 70 and 72 equal in number to the number of cylinders of the engine 10 and located in close proximity to the engine 10 as well as to the sequential engine function transducers which, in this case, comprise the fuel injector units 32', 34', 36', 38', 40' and 42'. The transducers comprise respective injector solenoids 48', 50', 52', 54', 56' and 58'. Each of the switching nodes comprises a suitable semiconductor switch device which in this case comprises transistors 74, 76, 78, 80, 82 and 84. It will be understand that other high current semiconductor switch devices such as FETs may also be employed. The switch nodes 62, 64, 66, 68, 70 and 72 are connected to an address generator 86 which is associated with the ECU 16' by way of a low voltage data communication line 60*b*. The communication line 60*b* and ground line 60*c* may be packaged along with the high current supply (power) line 60*a* as part of a wiring harness 87 which is much smaller and lighter than the wiring harness 44 shown in the prior art system of FIG. 1. The address generator 86 is capable of operating under the control of the ECU 16' to generate a sequence of addresses which are uniquely associated with and recognizable by the switch nodes 62, 64, 66, 68, 70 and 72 so as to selectively and individually render the transistors 74, 76, 78, 80, 82 and 84 conductive in a sequence correlated to the firing order of the cylinders in the engine 10. The address signals are typically of fractional ampere amplitude consistent with the low voltage rating of data signals in conventional 12-volt vehicle electrical systems.

It can be seen that to direct current through the solenoid coil 48' the address generated by device 86 need be such as to be recognizable exclusively and uniquely by the switch node 62; i.e., rendering transistor 74 completes the circuit from the supply line 60*a* through the solenoid 48' through the transistor 74 and to ground. Each of the other transistor 76, 78, 80, 82 and 84 can be similarly selected in sequence.

Although shown and described relative to fuel injector solenoids for a diesel engine, the system of FIG. 3 can be equally representative of actuators for intake and/or exhaust valves as well as spark ignition devices for gasoline engines.

Figure 5:
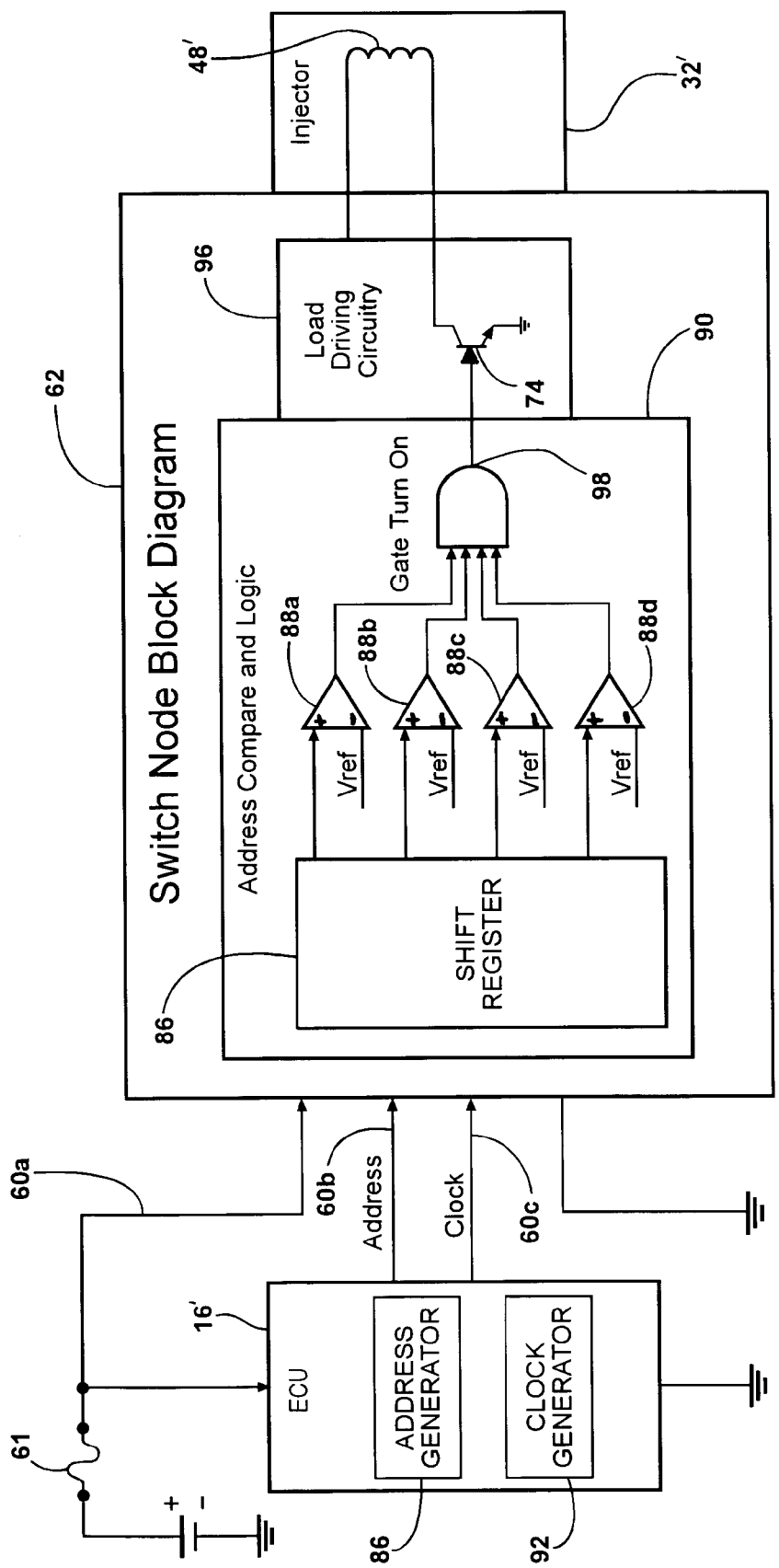
FIG. 5 is a block diagram of an illustrative switch node to be used in the system of FIG. 3.

Referring now to FIG. 5, the overall architecture of a switch node, in this case 62, is shown. The switch node could be implemented with a microcontroller, but the complexity or data manipulation of a microcontroller is not needed. The following example shows how this system can be implemented with discrete logic. This example is based on a 4-bit address scheme but the system is not limited to a 4-bit address scheme. Using the 4-bit address scheme still allows for the injector to have an accuracy of 1 degree of engine rotation while having a clock rate less than 1 MHz. Switch node 62 comprises an address compare and logic circuitry 90 and a load driving circuitry 96. Address compare and logic circuitry 90 will determine if and when the injector 48' is turned on. The load driving circuitry 96 will take the turn on state from the address compare circuitry 90 and will turn on or off the injector via the transistor 74. Once the correct address is sent to turn on injector 48', the ECU will stop sending the clock signal to hold the address in the address compare and logic circuitry 90 for the duration of the on time of the injector 48'. When the turn on time duration is complete, the ECU will start the clock again and send a different address that is not the address of switch node 62, turning off injector 48'.

The ECU and switch node are powered by the vehicle battery via the power line 60*a*. This power feed also connects the injector 48' to the vehicle battery. The address line 60*b* connects the switch node to the ECU and is used to transmit the address that is generated by the ECU's address generator 86 to the switch node. Clock line 60*c* connects the switch node to the ECU and is used to transmit the clock signal that is generated by the ECU's clock generator 92 to the switch node. When the ECU wants to turn on the injector 48', it sends the address of switch node 62. The switch node will accept the address data from the ECU as long as there is a clock signal. Once the ECU has transmitted the 4-bit address it will turn off the clock signal. The address data is clocked into the shift register 86 of the address compare and logic circuitry 90. This will take the address information that is in a serial format and will put it into parallel format so the address can be compared to the correct address of the switch node 62. The parallel output of the shift register 86 will be compared to the switch node's correct address via the comparators 88*a*, 88*b*, 88*c*, and 88*d*. Logic 'And' gate 98 uses Boolean algebra to verify the output of the comparators 88*a*, 88*b*, 88*c*, and 88*d* to the correct address. If the sent address was correct, the address compare and logic circuitry 90 will tell the load driving circuitry 96 to turn on the transistor 74. This creates a path to ground for the injector 48', turning it on. If the sent address is not the address of node 62, the address compare and logic circuitry 90 will tell the load driving circuitry 96 to turn off transistor 74, turning off injector 48'.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for actuating a plurality of sequential engine function transducers comprising:

a plurality of switch nodes, each switch node including a high current switch and an individually addressable driver for causing the switch to conduct when an address unique to the driver is received, said nodes being disposed in close physical proximity to the respective engine function transducers to be actuated;

a power line for commonly supplying electrical power to all of the switch nodes;

an engine control unit relatively remote from the switch nodes for supplying a sequence of addresses, and;

a set of low voltage data communication lines connecting the engine control unit to the drivers to close the switches in a predetermined order, each address in the sequence being uniquely associated with an individual switch node;

said system further comprising a single grounding path from the engine function transducers directly to ground.

2. The system defined in claim 1 wherein each switch node includes a semiconductor switch.

3. The system defined in claim 2 wherein each semiconductor switch is a transistor.

4. The system defined in claim 1 wherein each transducer is a fuel injector solenoid.

5. The system defined in claim 1 wherein each transducer is an intake or exhaust valve actuator.

6. The system defined in claim 1 wherein each transducer is a spark ignition device.

7. The system defined in claim 1 wherein the power line, data communication lines and grounding path are packaged in a wiring harness.

8. A system for actuating a plurality of sequential engine function transducers comprising:

a plurality of switch nodes, each switch node including a high current switch and an individually addressable driver for causing the switch to conduct when an address unique to the driver is received, said nodes being disposed in close physical proximity to the respective engine function transducers to be actuated;

a power line for commonly supplying electrical power to all of the switch nodes;

an engine control unit relatively remote from the switch nodes for supplying a sequence of addresses, and;

a set of low voltage data communication lines connecting the engine control unit to the drivers to close the switches in a predetermined order, each address in the sequence being uniquely associated with an individual switch node;

wherein the individually addressable driver included in each switch node has address compare and logic circuitry for determining whether to cause the switch to conduct.

9. The system as defined in claim 8 further comprising load driving circuitry in the individually addressable drivers operatively associated with the address compare and logic circuitry to turn on or off the respective engine function transducer via the switch.

10. A system for selectively actuating a plurality of engine function transducers comprising:

a multi-cylinder internal combustion automotive engine having a firing order;

a plurality of engine function transducers numbering at least one per engine cylinder;

a plurality of electrical switches numbering at least one per function transducer, said switches being disposed in close proximity to said engine and being connected to a power line to supply actuation power to said transducers when conducting;

a plurality of addressable switch control nodes having inputs adapted to be connected to a set of address carrying data lines and outputs connected to respective switches;

an engine control unit including an address generator for sequentially generating switch addresses in a sequence related to said firing order; and a plurality of low current address lines connected between the address generator and the inputs of the switch control nodes to sequentially cause the switches to become conductive in the firing order.

* * * * *